United States Patent
Smetana et al.

(10) Patent No.: US 8,448,766 B2
(45) Date of Patent: May 28, 2013

(54) BI-DIRECTIONAL CLUTCH WITH STAGGERED ROLLER ELEMENTS

(75) Inventors: Tomas Smetana, Herzogenaurach (DE);
Brian Lee, York, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 398 days.

(21) Appl. No.: 12/818,751

(22) Filed: Jun. 18, 2010

(65) Prior Publication Data
US 2011/0000755 A1    Jan. 6, 2011

Related U.S. Application Data

(60) Provisional application No. 61/222,799, filed on Jul. 2, 2009.

(51) Int. Cl.
*F16D 15/00* (2006.01)
*F16D 41/06* (2006.01)

(52) U.S. Cl.
USPC .............................................. 192/38; 192/77

(58) Field of Classification Search
USPC ................ 192/38, 45.003, 45.005; 188/82.84
See application file for complete search history.

(56) References Cited

U.S. PATENT DOCUMENTS

| | | | |
|---|---|---|---|
| 1,947,703 A * | 2/1934 | Fishburn | 192/45.003 |
| 3,373,625 A | 3/1968 | Keller | |
| 4,772,245 A | 9/1988 | Readman et al. | |
| 5,706,700 A * | 1/1998 | Takagi et al. | 192/45.005 |
| 5,823,499 A | 10/1998 | Ito et al. | |
| 6,409,001 B1 | 6/2002 | Kerr | |
| 6,508,140 B2 | 1/2003 | Zaps | |
| 6,846,262 B2 * | 1/2005 | Williams et al. | 192/38 |
| 2008/0188315 A1 | 8/2008 | Bosserdet | |
| 2010/0126817 A1 | 5/2010 | Smetana et al. | |
| 2010/0126818 A1 | 5/2010 | Lee | |

FOREIGN PATENT DOCUMENTS

GB    1132649 A    11/1968

* cited by examiner

*Primary Examiner* — Rodney Bonck
(74) *Attorney, Agent, or Firm* — Fitzpatrick, Cella, Harper & Scinto

(57) ABSTRACT

A coupling having at least two concentric rings, each having a circumferential surface and a recess, and at least two roller elements. The roller elements are each disposed in a channel formed by the circumferential surface of one of the rings and the recess of another of the rings. In some example embodiments of the invention, the coupling includes a coupling member with a bearing surface, at least one of the rings includes a split and the split ring is urged against the bearing surface when there is relative rotation between the rings. The coupling member is, for example, a shaft or a gear.

10 Claims, 3 Drawing Sheets

BI-DIRECTIONAL CLUTCH WITH STAGGERED ROLLER ELEMENTS

CROSS REFERENCE TO RELATED APPLICATION

This application claims the benefit under 35 U.S.C. 119(e) of provisional U.S. Application No. 61/222,799, filed Jul. 2, 2009, which is hereby incorporated by reference, as if set forth fully herein.

FIELD OF THE INVENTION

The invention relates generally to a bi-directional coupling, and more specifically to a bi-directional clutch with staggered roller elements.

BACKGROUND OF THE INVENTION

U.S. Pat. No. 6,409,001 (Kerr), hereby incorporated by reference in its entirety as if set forth fully herein, discloses a multi-directional coupling including a tubular slipper, a tubular member, a race, and roller members disposed in channels defined by the tubular slipper and the tubular member. Torque applied to the member forces the rollers to roll up the side walls of the channel pockets (or recesses), forcing the slipper to radially expand, thereby increasing the radial force exerted on the slipper against the race. As more torque is applied to the member, the slipper and the race become rotationally locked to the member.

Kerr is limited in that the tubular slipper and tubular member each include a pocket for every roller. Pockets are typically produced by complex forming or machining, both of which are expensive processes. Thus, there is a long-felt need for a multi-directional coupling with fewer pockets and staggered roller elements.

BRIEF SUMMARY OF THE INVENTION

Example aspects of the present invention broadly comprise a coupling with at least two concentric rings, each having a circumferential surface and a recess, and at least two roller elements. The roller elements are each disposed in a channel formed by the circumferential surface of one of the rings and the recess of another of the rings. In some example embodiments of the invention, the coupling includes a coupling member with a bearing surface, at least one of the rings includes a split formed therein and the split ring is urged against the bearing surface when there is relative rotation between the rings. The coupling member may be a shaft or a gear.

In some example embodiments of the invention, the roller elements have respective circumferential surfaces that contact one another when there is relative rotation between the rings. In some example embodiments of the invention, relative rotation of the rings adjusts a radial position of at least one of the roller elements. For example, a first one of the roller elements may be adjusted radially inwardly and a second one of the roller elements may be adjusted radially outwardly.

Other example aspects of the present invention broadly comprise a coupling with at least two concentric rings and at least two rollers arranged in a radial space between the rings. The rollers are disposed in a first torque path beginning at a first one of the rings, extending through a first one of the rollers and a second one of the rollers, and ending at another one of the rings, when there is relative rotation between the rings along a first direction. In some example embodiments of the invention, the rollers have respective circumferential surfaces that contact one another when there is relative rotation between the rings.

In some example embodiments of the invention a third one of the rollers is disposed in a second torque path beginning at the first ring, extending through the first roller and the third roller, and ending at the another ring, when there is relative rotation between the rings along a second direction, opposite the first direction.

In some example embodiments of the invention, the rings have recesses and circumferential surfaces, and the rollers are disposed in channels formed by the recesses and the circumferential surfaces. In some example embodiments of the invention, at least one of the rings has a split formed therein and a friction surface, and relative rotation of the rings adjusts a radius of the friction surface. Some example embodiments of the invention include a coupling member with a bearing surface, and adjustment of the radius engages the friction surface and the bearing surface. The coupling member may be a shaft or a gear.

BRIEF DESCRIPTION OF THE DRAWINGS

The nature and mode of operation of the present invention will now be more fully described in the following detailed description of the invention taken with the accompanying drawing figures.

DETAILED DESCRIPTION OF THE INVENTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1:
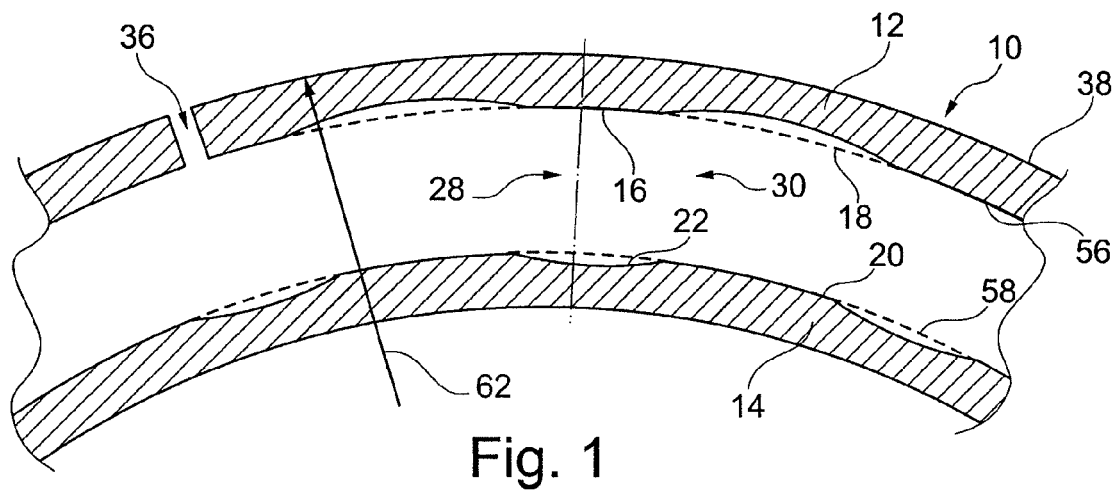
FIG. 1 is a detail section view of a coupling according to an example aspect of the invention shown without rollers.
Figure 2:
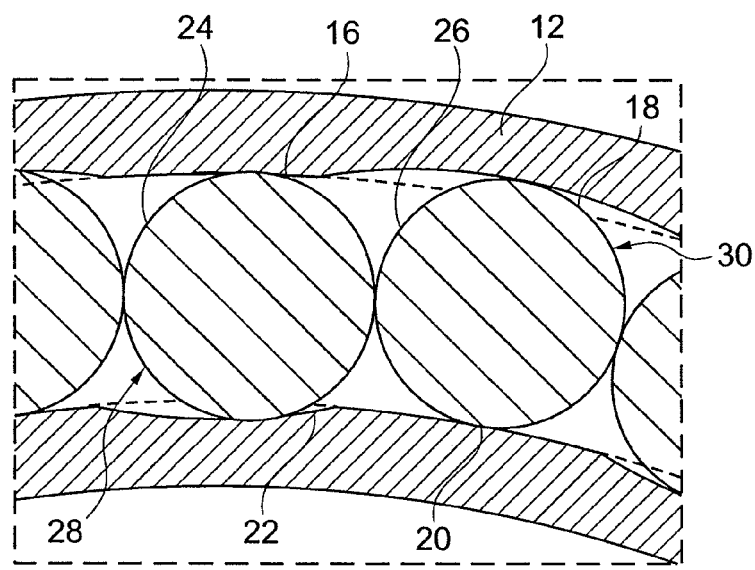
FIG. 2 is a detail section view of a coupling according to an example aspect of the invention showing rollers.
Figure 3:
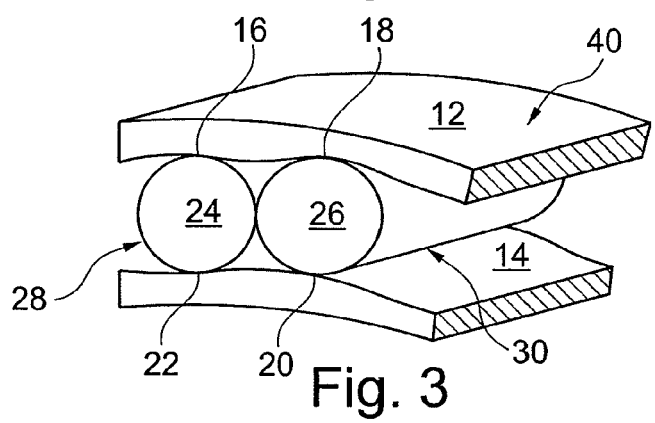
FIG. 3 is a partial isometric view of the coupling shown in FIG. 2.

The following description is made with reference to FIGS. 1-3. FIG. 1 is a detail section view of a coupling according to an example aspect of the invention shown without rollers. FIG. 2 is a detail section view of a coupling according to an example aspect of the invention showing rollers. FIG. 3 is a partial isometric view of the coupling shown in FIG. 2. In an example embodiment of the invention, coupling 10 includes rings 12 and 14. Rings 12 and 14 are concentric. That is, ring 12 and ring 14 each surround a common center (not shown). Ring 12 includes circumferential surface 16 and recess 18. Ring 14 includes circumferential surface 20 and recess 22. Recesses 18 and 22 can may have an arcuate or involute shape, for example, although other suitable shapes also can be employed.

Coupling 10 includes rollers 24 and 26 (although for clarity, they are not shown in FIG. 1). Roller 24 is disposed in channel 28 formed by circumferential surface 16 of ring 12 and recess 22 of ring 14. Roller 26 is disposed in channel 30 formed by recess 18 of ring 12 and circumferential surface 20 of ring 14. Channels 28 and 30 extend parallel to central axes (not shown) of rollers 24 and 26, respectively (FIG. 3). Although two rings and a specific number of rollers are shown, the scope of the invention is not limited to that configuration only, and, broadly construed, alternatively can include different numbers of rings and rollers than those shown and described herein.

Figure 4:
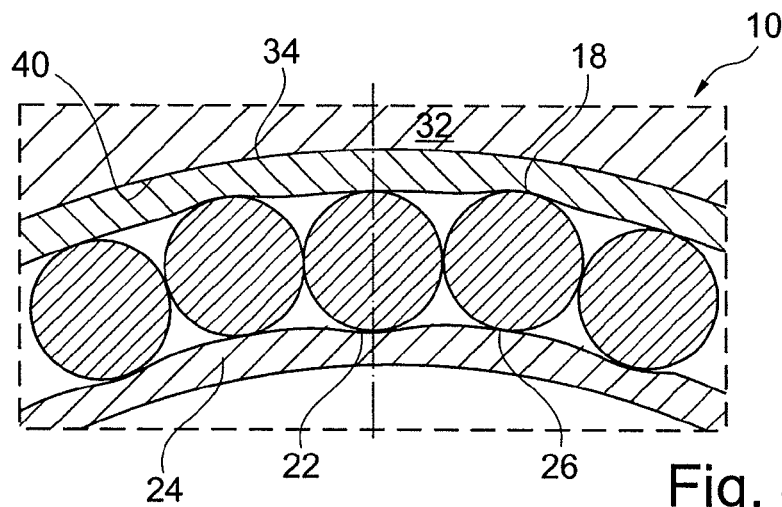
FIG. 4 is a detail section view of a coupling according to an example aspect of the invention shown in an unlocked condition.
Figure 5:
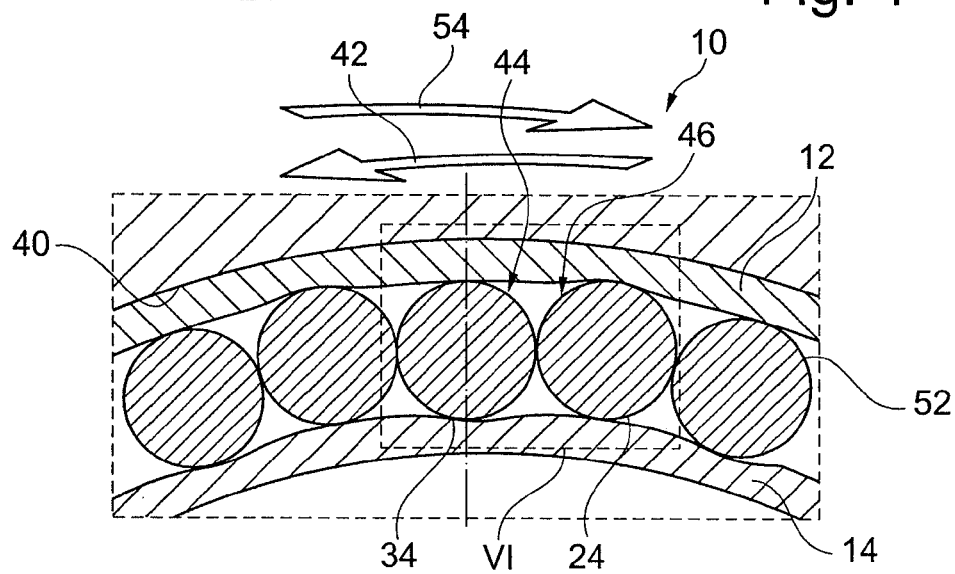
FIG. 5 is a detail section view of a coupling according to an example aspect of the invention shown in a locked condition.

The following description is made with reference to FIGS. 1-5. FIG. 4 is a detail section view of a coupling according to an example aspect of the invention shown in an unlocked condition. FIG. 5 is a detail section view of a coupling according to an example aspect of the invention shown in a locked condition. In an example embodiment of the invention, coupling 10 further includes coupling member 32, such as a shaft or a gear. Although coupling member 32 is shown disposed radially outside of rings 12 and 14, the scope of the invention is not limited to that configuration only, and, broadly construed, alternatively can include member 32 disposed radially inside of rings 12 and 14.

Member 32 includes bearing surface 34. Ring 14 can include split 36 (FIG. 1). That is, in one example embodiment of the invention, circumference 38 of ring 14 is discontinuous at split 36. Split 36 can be provided completely through, or through only part, of ring 12. In an unlocked condition (FIG. 4), rollers 24 and 26 are disposed in recesses 22 and 18, respectively. Channels 28 and 30 provide clearance between rings 12 and 14, and rollers 24 and 26, in the unlocked condition. Surface 40 of ring 12 is concentric with and adjacent to bearing surface 34. Surfaces 34 and 40 are in minimal frictional contact when rollers 24 and 26 are disposed in recesses 22 and 18, allowing relative rotation of ring 12 and member 32. As described below, in a locked condition (FIG. 5), surface 40 is urged against surface 34 when there is relative rotation between rings 12 and 14 (i.e., when at least one ring is rotated relative to the other).

Figure 6:
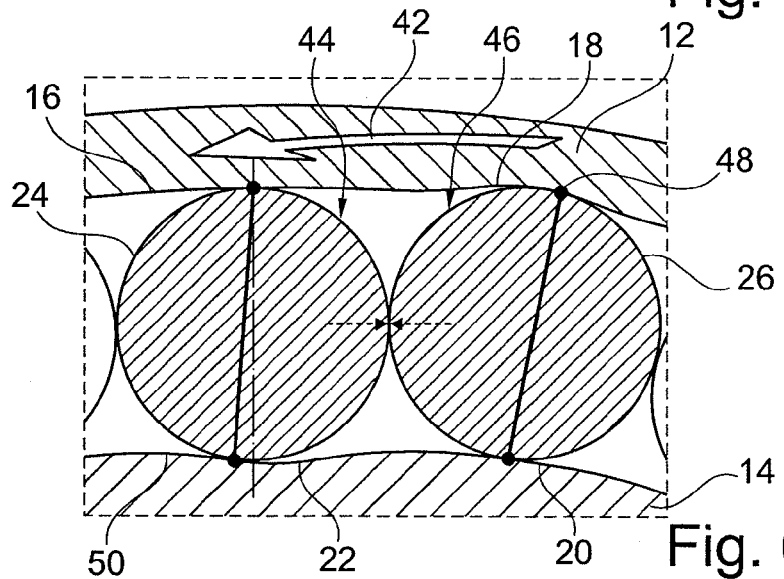
FIG. 6 is a detail section view of encircled region 6 of FIG. 5.
Figure 7:
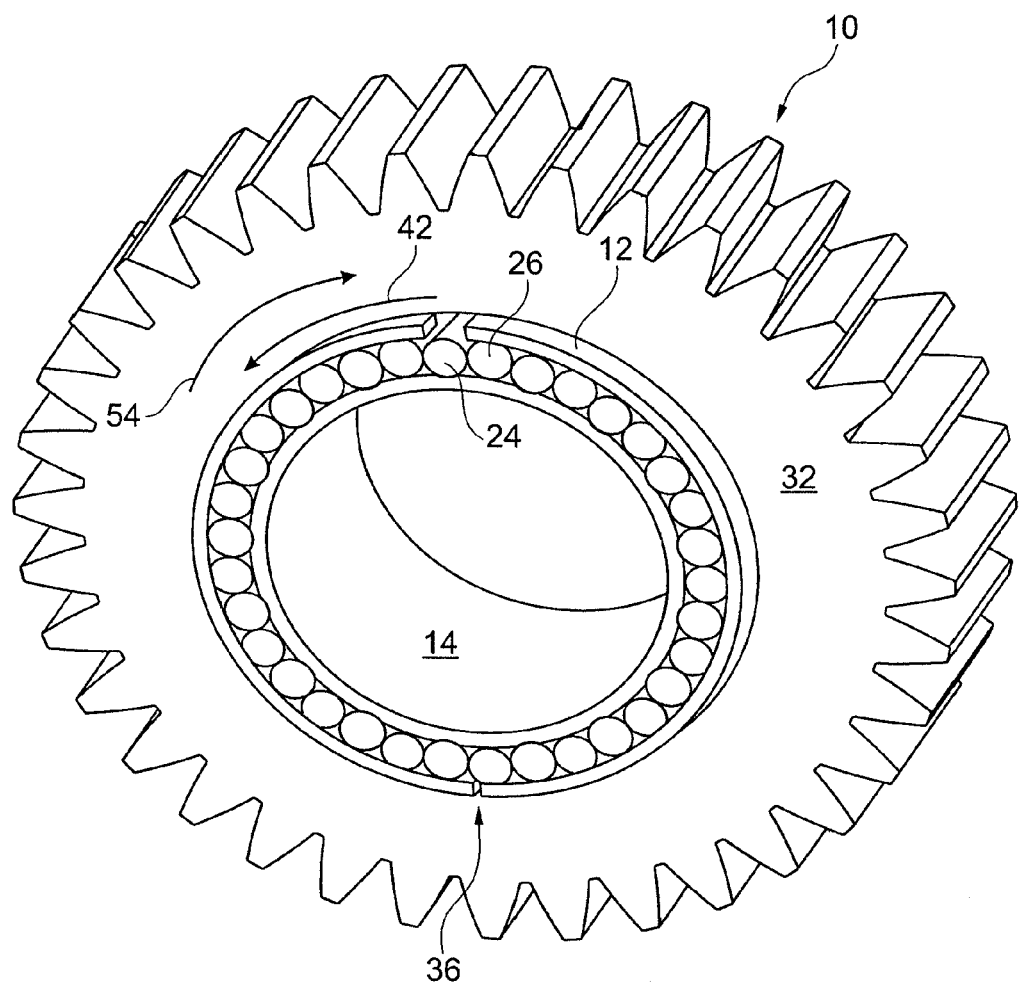
FIG. 7 is an isometric view of a coupling according to an example aspect of the invention.

The following description is made with reference to FIGS. 1-7. FIG. 6 is a detail section view of encircled region 6 of FIG. 5. FIG. 7 is an isometric view of a coupling according to an example aspect of the invention. Rotation of ring 12 in direction of arrow 42 adjusts rollers 24 and 26, thereby radially displacing ring 12 and surface 40. In an example embodiment of the invention, rollers 24 and 26 include circumferential surfaces 44 and 46, respectively, and rotation of ring 12 in direction of arrow 42 urges surface 46 of roller 26 into contact with surface 44 of roller 24. Rotation of ring 12 in direction of arrow 42 urges roller 26 in direction of arrow 42 when edge 48 of recess 18 contacts circumferential surface 46 of roller 26. Surface 46 contacts surface 44 as described above, urging roller 24 in direction of arrow 42 until surface 44 contacts edge 50 of recess 22.

In an example embodiment of the invention, one each of rollers 24 and 26 form a pair of rollers and coupling 10 includes a plurality of roller pairs. Each pair of rollers is disposed within a pair of channels—one partially formed by a single recess on ring 12 and the other partially formed by a single recess on ring 14. That is, the pair of rollers are disposed in a pair of recesses. Rollers pairs have a radially outer recess and a radially inner recess, and cooperation between the rollers and the rings, as well as between the individual rollers in the pair, redirects rotation of the rings into radial displacement of each roller in the pair as described below.

In an example embodiment of the invention, continued rotation of ring 12 in direction of arrow 42 adjusts radial positions of rollers 24 and 26. Roller 26 is urged radially inward by edge 48 of recess 18 and roller 24 is urged radially outward by edge 50 of recess 22. The radial positions of rollers 24 and 26 are adjusted until clearance between rollers 24 and 26 and rings 12 and 14 is eliminated. Clearance is eliminated when roller 24 contacts circumferential surface 16 of ring 12 and roller 26 contacts circumferential surface 20 of ring 14. Split 36 in ring 12 allows ring 12 to radially displace from contact with the rollers. Therefore, further rotation of ring 12 increases friction between surfaces 34 and 40 to lock the coupling.

In an example embodiment of the invention, coupling 10 includes the concentric rings 12 and 14, and rollers 24 and 26. Rollers 24 and 26 are arranged in spaces 28 and 30, respectively. As shown in FIG. 5, when ring 12 is rotated in direction of arrow 42, rollers 24 and 26 are disposed in a first torque path beginning at ring 12, extending through roller 26 and roller 24, and ending at ring 14.

Rollers 24 and 26 include respective circumferential surfaces 44 and 46, and roller surfaces 44 and 46 contact one another when rings 12 and 14 are rotated relative to one another. Coupling 10 may include at least one additional roller 52 (FIG. 5). In an example embodiment of the invention, when ring 12 is rotated in direction of arrow 54 (FIG. 5), opposite direction of arrow 42, roller 52 is disposed in a second torque path beginning at ring 12, extending through roller 26 and roller 52, and ending at ring 14. That is, when ring 12 is rotated in direction of arrow 54, rollers 26 and 52 form a pair of rollers and the discussion of roller pairs above applies.

In an example embodiment of the invention, ring 12 includes recess 18 and circumferential surfaces 16 and 56, and ring 14 includes circumferential surface 20 and recesses 22 and 58 (FIG. 1). Channel 28 is formed between recess 22 and opposing surface 16; channel 30 is formed between recess 18 and opposing surface 20; and channel 60 is formed between recess 58 and opposing surface 56. Rollers 24, 26, and 52 (FIG. 5) are disposed in channels 28, 30, and 60 (FIG. 1), respectively.

In an example embodiment of the invention, ring 12 includes split 36 and friction surface 38 (FIG. 1), and relative rotation of rings 12 and 14 adjusts radius 62 of friction surface 38. Coupling 10 may include coupling member 32 with bearing surface 34 (FIG. 4), and adjustment of friction surface radius 62 engages friction surface 38 and bearing surface 34. In an example embodiment of the invention, coupling member 32 is a gear as shown in FIG. 7 and adjustment of friction surface radius 62 includes expanding ring 12 and friction surface 38 against bearing surface 34. In another example embodiment of the invention (not shown), ring 14 includes split 36, coupling member 32 is a shaft including bearing surface 34 disposed radially inside of ring 14 friction surface 38, and adjustment of radius 62 includes compressing ring 14 and friction surface 38 against bearing surface 34.

In an example embodiment of the invention, coupling 10 enables selective torque transmission between rings 12 and 14, and member 32. Applications for coupling 10 include synchronizers for vehicular transmissions and transfer cases, and accessory drive clutches for combustion engines, however, the scope of the invention is not limited to those applications only, and, broadly construed, alternatively can include applications other than those shown and described herein.

In an example embodiment of the invention, minimal torque is transmitted by frictional contact between surfaces 34 and 40 when the rollers are maintained in the recesses (i.e., when relative rotation of the rings is restricted). That is, torque in excess of the minimal torque transmitted by the frictional contact is not transmitted between the rings but instead causes relative rotation (or slip) between rings 12 and 14, and member 32. However, when the rollers are free to move along the recesses (i.e., relative rotation of the rings is not restricted), the resulting radial displacement tightly engages surfaces 34 and 40 and the excess torque is fully transmitted through the rollers as described above. Therefore, the coupling may act as a clutch to selectively engage and disengage torque transmission between rings 12 and 14, and member 32.

The disclosed coupling is described with fewer recesses than are in the prior art. Recesses can require complex forming or machining to create the ramp structures. The prior art describes two recesses for each roller, but the inventive solution disclosed herein employs only one per roller (although more can be employed), and reduces the quantity of recesses by at least half, thereby simplifying the manufacturing process.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What We claim is:

1. A coupling comprising:
    at least two concentric rings, each comprising a circumferential surface and a recess;
    at least two roller elements, wherein each of the roller elements is disposed in a channel formed by the circumferential surface of one of the rings and the recess of another of the ring; and
    a coupling member with a bearing surface,
    wherein at least one of the rings has a split formed therein, and is urged against the bearing surface when there is relative rotation between the rings, and
    wherein the roller elements comprise respective circumferential surfaces that contact one another when there is relative rotation between the rings.

2. The coupling of claim 1, wherein the coupling member is a shaft or a gear.

3. The coupling of claim 1, wherein relative rotation of the rings adjusts a radial position of at least one of the roller elements.

4. A coupling comprising:
    at least two concentric rings, each comprising a circumferential surface and a recess;
    at least two roller elements, wherein each of the roller elements is disposed in a channel formed by the circumferential surface of one of the rings and the recess of another of the ring; and
    a coupling member with a bearing surface,
    wherein at least one of the rings has a split formed therein, and is urged against the bearing surface when there is relative rotation between the rings,
    wherein relative rotation of the rings adjusts a radial position of at least one of the roller elements, and
    wherein a first one of the roller elements is adjusted radially inwardly and a second one of the roller elements is adjusted radially outwardly.

5. A coupling comprising:
    at least two concentric rings; and
    at least three rollers arranged in a radial space between the rings,
    wherein the rollers are disposed in a first torque path beginning at a first one of the rings, extending through a first one of the rollers and a second one of the rollers, and ending at another one of the rings, when there is relative rotation between the rings along a first direction, and
    wherein a third one of the rollers is disposed in a second torque path beginning at the first ring, extending through the first roller and the third roller, and ending at the another ring, when there is relative rotation between the rings along a second direction, opposite the first direction.

6. The coupling of claim 5, wherein the rings comprise recesses and circumferential surfaces, and the rollers are disposed in channels formed by the recesses and the circumferential surfaces.

7. The coupling of claim 6, wherein at least one of the rings has a split formed therein and a friction surface, and relative rotation of the rings adjusts a radius of the friction surface.

8. The coupling of claim 7, further comprising a coupling member with a bearing surface, wherein adjustment of the radius engages the friction surface and the bearing surface.

9. The coupling of claim 8, wherein the coupling member is a shaft or a gear.

10. The coupling of claim 5, wherein the rollers comprise respective circumferential surfaces that contact one another when there is relative rotation between the rings.

* * * * *